(No Model.) 5 Sheets—Sheet 1.

T. L. BEAMAN.
FARE BOX.

No. 399,820. Patented Mar. 19, 1889.

WITNESSES:
Phil C. Dieterich
C. Sedgwick

INVENTOR:
T. L. Beaman
BY Munn & Co.
ATTORNEYS (No Model.) 5 Sheets—Sheet 2.

T. L. BEAMAN.
FARE BOX.

No. 399,820. Patented Mar. 19, 1889.

WITNESSES:
Phil C. Dieterich.
C. Sedgwick.

INVENTOR,
T. L. Beaman
BY Munn & Co.
ATTORNEYS (No Model.) 5 Sheets—Sheet 3.
T. L. BEAMAN.
FARE BOX.

No. 399,820. Patented Mar. 19, 1889.

WITNESSES:
Phil. C. Dieterich
C. Sedgwick

INVENTOR,
T. L. Beaman
BY Munn & Co
ATTORNEYS.

(No Model.) 5 Sheets—Sheet 4.
T. L. BEAMAN.
FARE BOX.

No. 399,820. Patented Mar. 19, 1889.

WITNESSES:
Phil. C. Dietrich.
C. Sedgwick.

INVENTOR,
T. L. Beaman
BY Munn & Co.
ATTORNEYS (No Model.) 5 Sheets—Sheet 5.

T. L. BEAMAN.
FARE BOX.

No. 399,820. Patented Mar. 19, 1889.

WITNESSES:
Phil C. Dietrich
C. Sedgwick

INVENTOR,
T. L. Beaman
BY Munn & Co
ATTORNEYS.

UNITED STATES PATENT OFFICE.

TIMOTHY L. BEAMAN, OF KNOXVILLE, TENNESSEE.

FARE-BOX.

SPECIFICATION forming part of Letters Patent No. 399,820, dated March 19, 1889.

Application filed April 18, 1888. Serial No. 271,048. (No model.)

*To all whom it may concern:*

Be it known that I, TIMOTHY L. BEAMAN, of Knoxville, in the county of Knox and State of Tennessee, have invented a new and Improved Fare-Box, of which the following is a full, clear, and exact description.

My invention relates to a box adapted for use in cars, stages, or other vehicles for receiving the fares of the passengers; and the invention has for its object to provide a fare-box which shall be proof against robbing implements in the hands of the driver of the vehicle or other person, and a box which is strong and more efficient generally for its purposes than boxes of this character heretofore devised.

The invention consists in certain novel features of construction and combinations of parts of the fare-box, all as hereinafter described and claimed.

Reference is to be had to the accompanying drawings, forming a part of this specification, in which similar letters of reference indicate corresponding parts in all the figures.

The two opposite side walls A A of the body of the fare-box are rigidly connected by top and bottom plates, $a$ $a'$, which are dovetailed and glued to them, and also by two vertical plates, $a^2$ $a^3$, and an inclined plate, $a^4$, which three latter plates are tongued and grooved and glued to the side walls, thus making a very strong frame for the box. The parts $a^2$ $a^3$ $a^4$ are at the outer or driver's side of the fare-box, the opposite or inner and passengers' side of the box consisting of an upper movable plate, B, a glazed removable door, C, and the front $d$ of the removable final-deposit fare-drawer D, which fills the bottom of the fare-box.

The upper plate, B, has tongues $b$ $b$, one at each end, and which enter slightly-inclined grooves $b'$ in the side walls of the box, (see Fig. 5,) and at its upper edge the plate B has a tongue, $b^2$, which enters a groove, $b^3$, in the top plate, $a$, of the box, while at its lower edge the plate B is rabbeted out at the inner face to provide a tongue, $b^4$, which overlaps a tongue, $c$, at the top and rear portion of the upper rail, $c'$, of the door C, the lower rail, $c^2$, of which is rabbeted out at $c^3$ at its front lower corner to receive a lip or flange, $d'$, which is an upper projection of the front $d$ of the fare-drawer D. This drawer is provided with a couple of safety-locks, $d^2$ $d^2$, the bolts of which are adapted for projection into sockets in the side walls of the box, and the door C is provided with a bolt, $c^4$, in its lower rail, which bolt may be projected into the adjacent side wall, A, of the box to hold the door up into place when the fare-drawer D is removed. The door or frame C is provided with a heavy glass plate, C', giving full view of the fare rests or tables of the box to the passengers or a detective inside of the car.

It is obvious that the door C cannot be removed without first unlocking and removing the lower drawer, D, and when this is done the door may easily be taken out by withdrawing its bolt $c^4$ and lifting it from the side-wall rabbets while lowering its upper tongue, c, from the rabbet and tongue $b^4$ of the upper plate, B, which plate may then be slipped downward from its grooves $b'$ $b'$ in the side walls. The plate B carries the pay-chute E, which overlies a middle chute, F, which I call the "fare-chute," and which is fitted in horizontal grooves $f f$ in the opposite walls A, allowing it to be slipped outward from the fare-box, as will be necessary when or before the plate B, carrying the pay-chute E, is to be removed, as above stated, and as will be necessary when it is desired to replace the heavy glass plate G at the outer or driver's side of the fare-box should said glass be broken. This glass G, which gives the driver full view of the fare-rests and the fares on them in the box, is fitted in opposite side grooves, $g$ $g$, made in the walls A A of the fare-box, said grooves extending clear through from the top of the box to the base of a rabbet, $g'$, which is formed at the upper edge of the fixed inclined lower front plate, $a^4$, of the box. The top plate, $a$, of the box is slotted at $g^2$, clear across between the glass-holding grooves $g$, thus allowing the glass G to be slipped through the slot $g^2$ and down in the side-wall grooves $g$ $g$, and close to the plate $a^2$ until the glass rests in the rabbet $g'$ of the plate $a^4$, whereupon a couple of screws, $g^3$, will be turned into the plate $a^2$ at the face and above the top of the glass to hold it in place; or, if preferred, a cleat may be held at the top of the glass and to the plate $a^2$ by the screws. After the glass is entered and secured, as above described, a plate or strip, H, of wood or metal, will be placed in the slot $g^2$ and the upper parts of the grooves $g$ $g$, and will be held securely by screws $h$ $h$, inserted through the plate and into the box-plate $a^2$ from the inside of the fare-box. These screws $h$ are accessible only after removing the upper plate or piece, B, at the opposite face of the fare-box, and the glass retaining or locking screws $g^3$ are accessible only after the door C is removed or opened; hence while the drawer D, which retains the door, is locked the plate B, carrying the pay-chute and the glass G, cannot be shifted to reach the fares deposited in the box, and the glass G may be easily replaced if broken.

Another important advantage of the above-described construction of the fare-box frame or outer wall is that it allows free access to the entire interior of the box, while allowing its cross pieces or plates $a$ $a'$ $a^2$ $a^3$ $a^4$ at the top, bottom, and one face of the box to be rigidly connected to the opposite side walls of the box, which gives greater strength to the entire structure than it would have were the box-top $a$ made removable.

In the lower part of the fare-box and over the fare-drawer D a plate, I, is fitted to slide by end tongues, $i$ $i$, into horizontal grooves made in the opposite side walls A A of the box, and this plate extends from the inner face of the door C to a lower safety-chute, J, which is fastened to the side walls and plate $a^4$ of the box and receives the fares from the upper fare-rests and deposits them in the drawer D below.

The fare-box is provided with the usual or any approved bell or gong, K, operative by a pull-rod, $k$, in reach of the driver to signal or call for payment of fares by the passengers, the amount of the fares to be dropped into the pay-chute E being indicated by a tablet, E', held either to the door C or to the box-frame. The pay-chute E may have any ordinary or approved construction adapting it to receive the fares and conduct them to the fare-chute below it.

Figure 9:
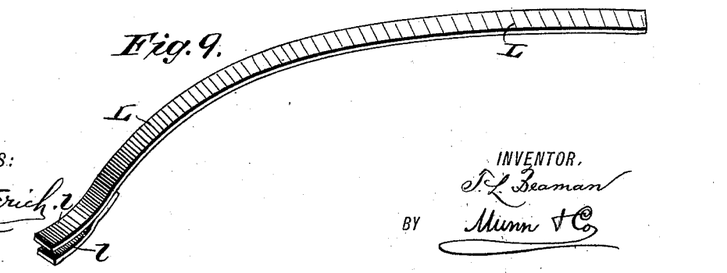
Fig. 9 is a perspective view of one form of a fare-robbing device, called a "fare-box snake.

I particularly describe the fare-chute F, and with more special reference to Figs. 1, 4, 5, and 10 to 16, inclusive, of the drawings, as follows: This fare-chute is designed chiefly to prevent the entrance or reaching of what is known as the "fare-box snake" to the fares deposited in the box, and also to prevent shaking of fares back through the fare-chute and out of the box at the pay-hole. This robbing-instrument is made in various forms, admitting its passage through the pay-chute. A good example of the snake is shown in Fig. 9 of the drawings; and it consists of a thin flexible strip of metal, L, formed at the end with a pair of spring clips or jaws, $l$ $l$, which will pick up either coins or tickets which they reach, and will pull them from the pay-chute as the snake is withdrawn.

Figure 4:
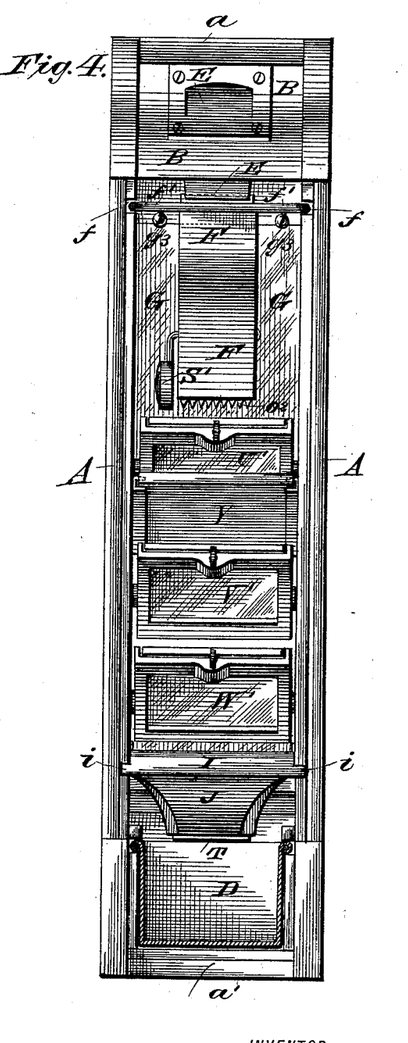
Fig. 4 is a view of the fare-box at its inner side, with the door next the passengers removed and the fare-drawer in vertical transverse section.
Figure 5:
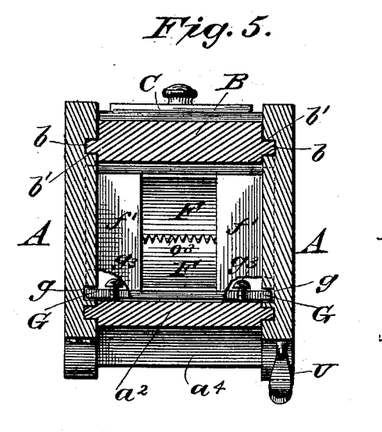
Fig. 5 is a plan view, in horizontal section on the line 1 1 in Fig. 1.

It will be seen in Figs. 4 and 5 of the drawings that the lower or discharge end of the fare-chute F is entirely clear of all side walls of the fare-box. I do not limit myself to any particular manner of thus supporting this middle fare-chute in the box; but I prefer to support it by the entrance of the upper horizontal flanges, $f'$ $f'$, to which the body of the chute is connected and from which it hangs, into the grooves $f f$ made in the opposite box-walls A A. These flanges or plates $f'$, while supporting the fare-chute, also constitute partitions preventing passage of fares past the chute into the upper or pay-chute compartment of the box should the box be inverted. The two opposite side walls M M of the fare-chute proper are preferably arranged about parallel with each other, and are connected at opposite edges with the irregularly-formed outer and inner walls, N O, respectively, of the chute. The outer wall, N, or that next the driver's side of the box, consists of an upper concavo-convex plate, the concave portion $n$ of which lies below the mouth of the superposed pay-chute E, while its convexed portion $n'$ extends to or a little beyond the point $n^2$, where the lower inclined portion, $n^3$, of the plate N joins it. The lower projecting flange or ledge at the point of junction $n^2$ is preferably formed with a series of teeth, $n^4$, facilitating the descent of the coin or ticket fares, and in a measure guarding against their abstraction. The opposite plate O of the fare-chute is or may be about straight or vertical at its upper part, and at its lower part it inclines downward and rearward and about parallel with the lower part, $n^3$, of the chute-wall N. The wall N is preferably extended upward either of itself or by an attached plate, $n^6$, which rises above the general level of the open top or mouth of the fare-chute, and prevents jumping of the fares over against the opposite plate $a^2$ of the box as they leave the mouth of the pay-chute.

Figure 12:
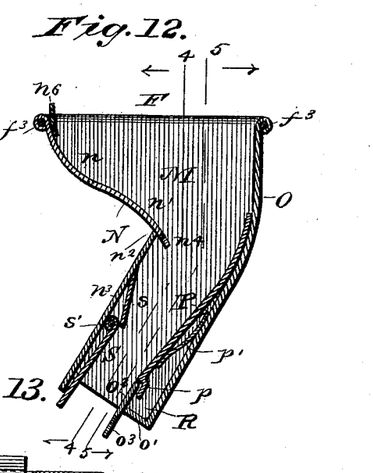
Fig. 12 is a vertical section of this chute.
Figure 13:
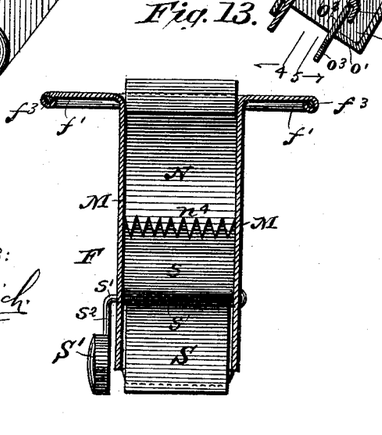
Fig. 13 is a transverse sectional elevation thereof taken on the line 4 4 in Fig. 12.
Figure 14:
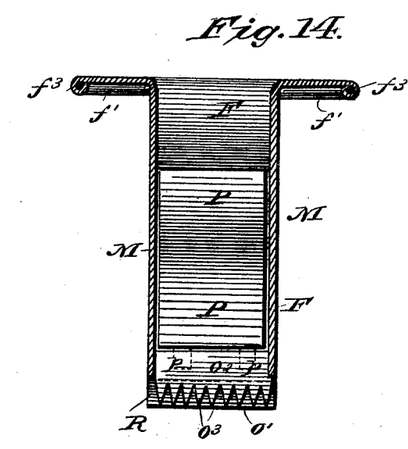
Fig. 14 is a like transverse view taken on the line 5 5 in Fig. 12.

The concavity $n$ of the chute wall or plate N, which faces the mouth of the pay-chute, is an important feature of my invention, it being manifest that, should the snake be passed down the pay-chute, it will first strike the concavity, which will deflect the snake toward the opposite wall O where or against which it will stick or bind, so as to prevent its passage farther downward through the chute. As an additional safeguard to the passage of the snake through the fare-chute than this wall N alone would afford, I have provided the chute at its interior with a yielding wall, P, which in giving way or receding under pressure of the snake leads the latter, preferably, into a trap, R, which is formed at the lower end of the chute, and, preferably, by an inturned lip or flange, $o'$, on the lower inclined part, $o$, of the chute plate or wall O, and a short plate, $o^2$, which projects into the chute from the edge of the lip $o'$ and preferably projects below the lip, where it is formed into or provided with a series of teeth $o^3$, facilitating the downslip of the fares over the face of the plate $o^2$, which in the normal position of the yielding wall P is flush with the face of said wall. This yielding wall may be made of any approved material, and will preferably be provided with a pendent lip or lips, $p$, forming stops at the inner face of the trap-wall $o^2$ to its inward movement, and keeping it about flush with the trap wall or plate $o^2$. This yielding wall may be arranged in various ways within the fare-chute. Its present preferred form is that of a plate of elastic metal—spring-brass, for instance—which is fixed at its upper end to the chute-wall, so as to hold the plate in position to be pressed upon by a snake or other robbing-instrument and to yield under the pressure, and this plate by its own elasticity normally springs inward until stopped by its lip or lips $p$ striking the trap-wall $o^2$ to hold the plate flush with said wall to allow free downward passage of fares. A slight modification is shown in Fig. 12 of the drawings, and consists of a plate-spring, $p'$, which is fitted between the chute-wall O and the yielding wall or plate P when it may not be sufficiently elastic of itself.

Figure 15:
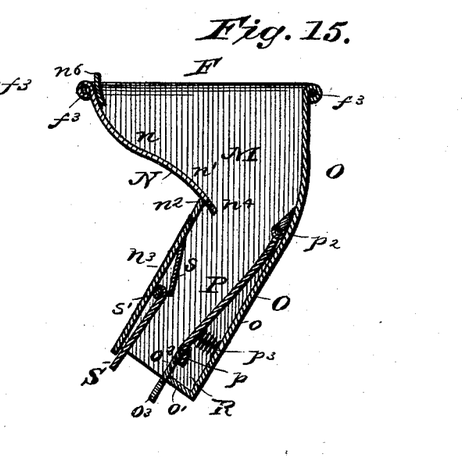
Figs. 15 and 16 are sectional side views of modified forms of the middle fare-chute.
Figures 16, 17, 18, 19:
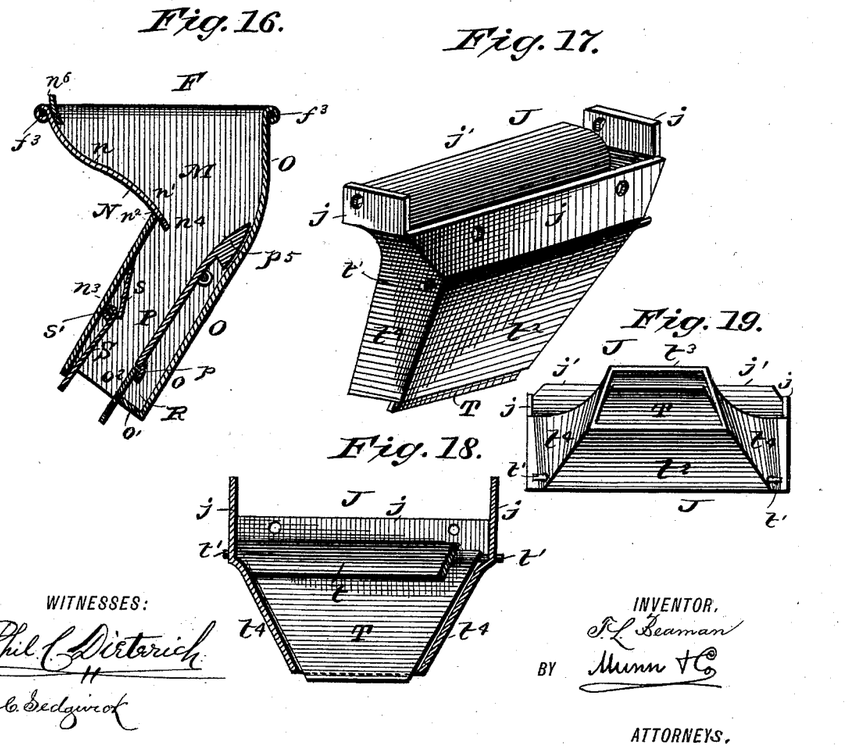
Fig. 17 is a perspective view of the lower fare-chute, which in practice is arranged just over the final-deposit fare-drawer.
Fig. 18 is a transverse vertical sectional view of this lower chute.
Fig. 19 is a bottom view thereof.

Another modification is shown in Fig. 15, and represents the plate or wall P hinged at its upper end at $p^2$ to the chute-wall O, and forced inward to the trap-wall $o^2$ by a spring, $p^3$, behind the yielding wall. Another modification is shown in Fig. 16, and consists in hinging the yielding wall at $p^4$ and weighting its upper end at $p^5$ so that it will normally gravitate to the stop-wall $o^2$ of the trap R, this trap formed in the interior of the chute being an important feature of my invention.

I do not limit myself to the use of one interior yielding wall and a robbing-implement trap formed within the chute below or behind said wall, as it is obvious that such interior yielding wall and trap may be provided at two or more sides of the chute within the scope of my invention.

Figure 10:
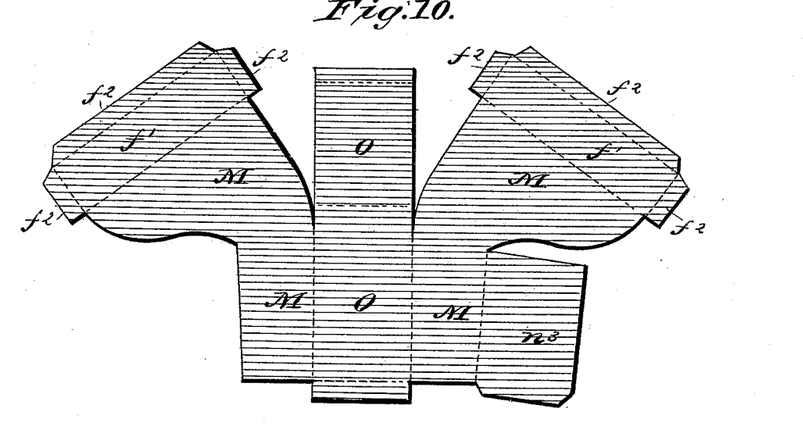
" Fig. 10 is a plan view of a blank from which most of the middle fare-chute of the box is formed.
Figure 11:
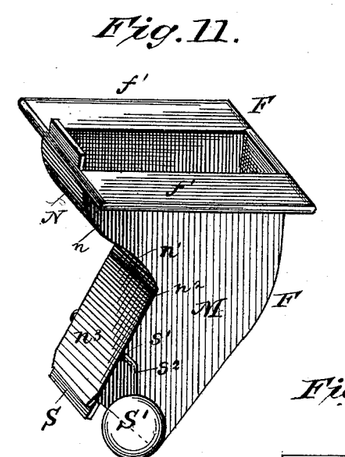
Fig. 11 is a perspective view of the middle chute.

The blank shown in Fig. 10 of the drawings indicates how the entire body portion of the fare-chute F, except the upper part, $n$, of the wall N, may be formed up from a single piece of sheet metal when bent up or over on the dotted lines, the letters on the blank corresponding to those given the walls of the chute in the aforesaid description. The extensions $f^2$ of the blank beyond the edges of its wings or side plates, $f'$, serve to inclose a stiffening-wire, $f^3$, in the finished chute, which strengthens it while forming rests and guides to the chute in the slots $f$ of the fare-box walls.

I may at times prefer to make the chute side flanges or plates, $f'$ $f'$, of glass, held to the chute-body by metal or wood frames or otherwise, and in this case the glass side plates while completing the partition or division between the pay-chute and fare-rest compartments of the box would freely admit light to both of said compartments. If preferred, the entire chute, except the yielding wall, may be made of glass or any other suitable material.

The operation of the chute F, having the concave wall N, yielding wall P, and trap R, as shown in the drawings, is as follows: Should the snake L or other flexible implement be passed down the pay-chute E, said implement will strike the concavity $n$ of the wall N of the fare-chute F, and will thereby be deflected to the opposite wall O of the chute or the upper end of the yielding wall P thereof. If the pressure on the implement is increased, it will only conform all the more to the concavity $n$ and will be raised higher at its extremity, as the two series of dotted lines in the fare-chute in Fig. 1 of the drawings clearly indicates. If by any possibility the snake or implement is forced farther down the fare-chute, it will press on the wall P, lying in its path, and will depress this wall, which would open the trap R and cause the implement to enter the trap, which would certainly stop farther downward movement of the implement, so that it could not reach the fares on the upper fare-rest below the fare-chute. Dotted lines in Fig. 1 indicate how the trap R may be made with an opening, $r$, from which the snake could be deflected to a part of the fare-box where the implement could not possibly reach the fares therein; but the construction with the closed trap is preferred. It will thus be manifest that the concaved wall N of the fare-chute is important and operative independently of the yielding wall P, and that the latter would be operative were the wall N made straight from end to end of its part $n'$ or be devoid of the concavity $n$; but these features of construction when combined in one fare-chute render it far safer against the passage of robbing implements than any device of this character known to me.

As a further precaution against the backward passage of fares through the fare-chute F should the fare-box be inverted than the projecting lip or ledge $o^2$ of the chute would alone afford, I have hinged at $s'$ within the chute and at its upper side or wall a gravitating plate or valve, S, the hinge of which is covered to prevent lodgment of fares on it by an inclined plate, $s$, fixed to the wall N of the chute below the lip or ledge $n^4$ thereof. This chute guard-plate is weighted, preferably, by fixing to its shaft or axis $s'$ an arm, $s^2$, which carries a weight, S', which, when the fare-box is in normal position, holds the plate open, as shown in Figs. 1, 11, 12, 15, and 16 of the drawings, to allow free passage of fares to the fare-rests below the chute; but should the fare-box be inverted and shaken with nefarious intent the weight S' will promptly and automatically swing the guard-plate shut against the opposing plate $s^2$ or edge of the fare-chute and effectually close or guard the chute against entrance of fares to it, and consequently prevent passage of fares from the pay chute or hole. An important peculiarity of this valve-plate S and the fare-chute is that the plate is arranged within the chute and the mouth of the chute stands entirely clear of all the side walls of the fare-box, and a cut-off valve or plate and chute thus arranged would be useful in any fare-chute, whether it have or have not the devices herein described for guarding against robbing implements.

I make special mention of the construction of the fare-chute F as an independent structure adapted for interposition between the pay-chute and fare-rests or deposit-passages of a fare-box and formed so as to separate the pay-chute and fare-rest or deposit-compartments of the box, and provided with a downwardly-inclined wall, which, when the fare-chute is applied to the fare-box, will face the pay chute or hole of the box, and also provided with an opposing yielding wall arranged for tapping a robbing implement. This separable construction of the fare-chute facilitates cheap manufacture of a fare-box and enables the chute to be readily applied to either new or old fare-boxes, and promotes the continued efficiency of the interior yielding wall and the implement-trap of the chute.

The lower or final fare-chute, J, is made with upper flanges, $j$, at one side and both ends, and through which flanges screws are passed into the box-plate $a^4$ and opposite side walls A A to hold the chute securely in place over the fare-drawer D. The side flange, $j$, of the chute next the movable lower partition-plate, I, fits a rabbet at the upper face of said plate.

Figures 1, 2:
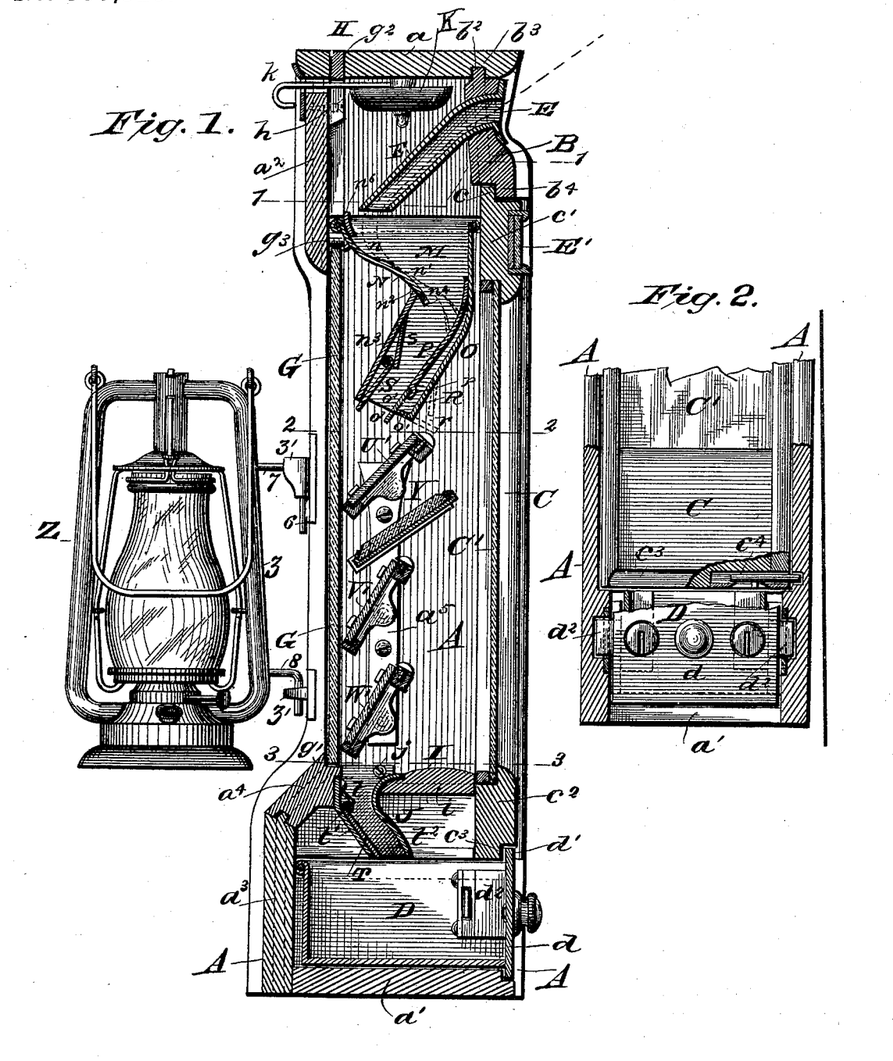
Figure 1 is a central vertical side elevation of my improved fare-box with the lantern attached.
Fig. 2 is a view of the lower part of the fare-box at the inner or passengers' side and partly broken away and in section.

As shown best in Figs. 1 and 4 of the drawings, the lower chute, J, tapers downward both ways to its mouth, which thus stands entirely clear of all sides of the box or the fare-drawer, to prevent backflow of fares through the chute should the fare-box be inverted; and to more certainly accomplish this object I have hinged at $t'$ in the chute a plate or valve, T, which normally rests on the side or wall $t^2$ of the chute, but which will promptly fall by its gravity against its opposite wall $t^3$ should the fare-box be inverted. A guard-plate, $t$, is fixed to the chute so as to project over the hinge $t'$ of the plate T and prevent lodgment of fares on the hinge as they pass down from the fare-rests above the chute. As shown best in Figs. 4 and 19, the wall $t^3$ is broader at the mouth of the chute J than its opposite wall $t^2$ to accommodate the taper of the plate-valve T, and conform the end walls, $t^4$ $t^4$, of the chute to the line of travel of the opposite ends of the plate T to effectually close the chute thereat during the opening and closing of the plate.

I have contrived a system of spring-retracted levers and a link by which to operate the fare-rests of the box to dump the fares from them, and only in accordance with usual regulations, which require the driver of the car or vehicle to dump all the fares from two upper rests onto a third rest at the end of a half-trip, and then to dump all fares in the box on returning or at the end of a complete or full trip at the starting-point.

The three levers U V W are fixed to the ends of the three successively lower fare-rests U' V' W', which are fitted, preferably, in or between metal bearing-plates $a^5$, fixed at the inner faces of the opposite side walls A A of the fare-box. I prefer to form the journals of the fare-rests next to the levers as pivots or journals, which are fixed to the inner faces of the levers U V W and form their fulcrums, having bearings in the plate $a^5$ at that side A of the fare-box. The levers project beyond the front of the box as thumb or finger plates in reach of the driver, who, by pressing them, dumps the rests, and the respective rests U' V' W' are brought back to normal positions by springs $u$ $v$ $w$, respectively, which are fitted to box-wall A. The two lower levers V W are connected by a link, X, which is pivoted to the lever W at $x$, and at its other end is provided with a slot, $x'$, receiving a pin, $v'$, fixed in the lever V. In the normal positions of these two levers V W the pin $v'$ is at the top of the slot $x'$, thus allowing the lever V to be operated to dump its fare-rest V' without actuating the lower lever W or its connected fare-rest W', but compelling simultaneous downward movement of both levers V W and the consequent dumping of both the rests V' W' whenever the lower lever, W, is operated.

Figure 3:
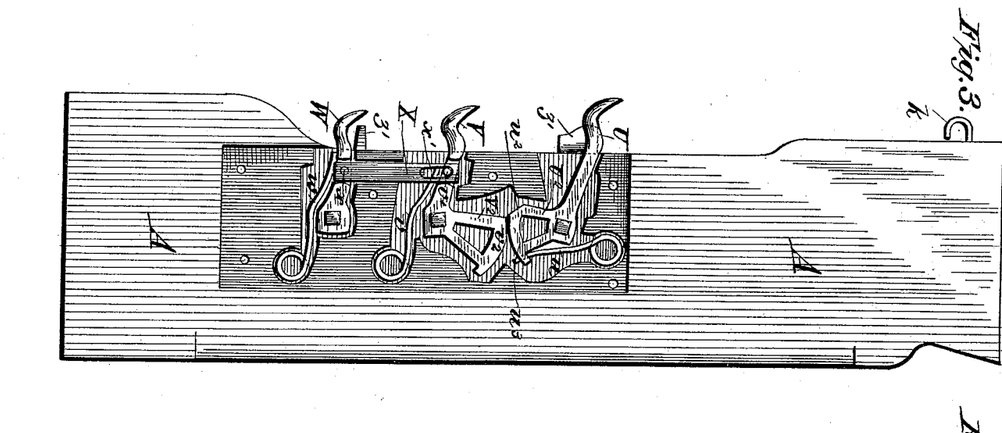
Fig. 3 is a side elevation of the fare-box with the plate which covers the fare-rest-operating mechanism removed.
Figure 6:
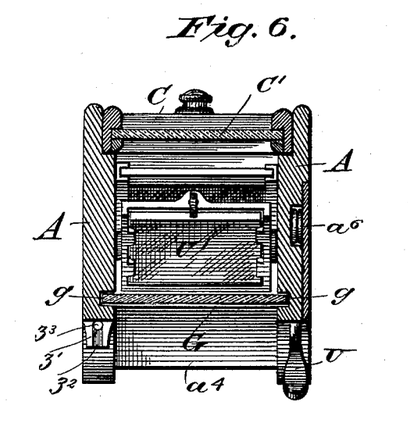
Fig. 6 is a horizontal section on the line 2 2 in Fig. 1.
Figure 7:
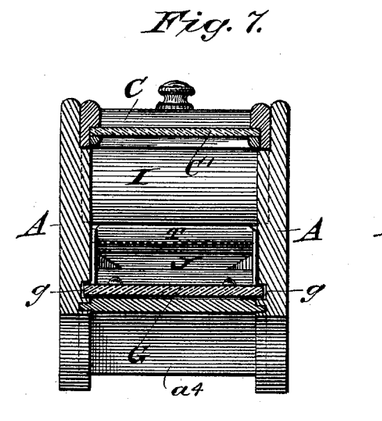
Fig. 7 is a horizontal section on the line 3 3 in Fig. 1.
Figure 8:
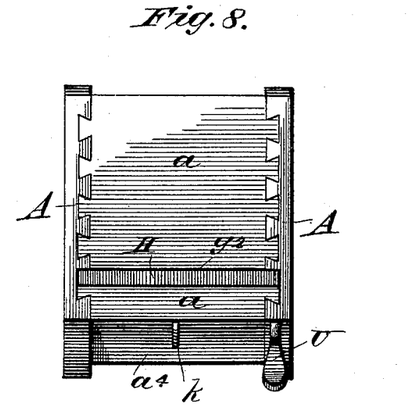
Fig. 8 is a plan or top view of the fare-box.

The two upper levers U V are provided, respectively, with angular or segmental extensions $U^2$ $V^2$, which have a radius greater than half the distance between the two lever-fulcrums, and the segments $U^2$ $V^2$, respectively, are cut away at $u^2$ $v^2$ at their outer corners, and in the normal positions of the levers the flattened or concaved edge-portion $v^2$ of the segment $V^2$ faces the rounded or peripheral edge $u^3$ of the segment $U^2$, thus preventing the lowering of the lever $V'$ and the tilting of its fare-rest V until after the upper lever U has been lowered to tilt its fare-rest $U'$ and carry the cut-away edge portion $u^2$ of the segment $U^2$ opposite the edge portion $v^2$ of the segment $V^2$ of the lever V, thus always compelling the dumping of the upper fare-rest U before the next lower or intermediate rest V can be dumped, and as the lower lever W of the bottom fare-rest $W'$ can be operated to dump said rest only after the middle lever has been operated to dump the fare-rest V, or simultaneously with the dumping of said latter rest, it is obvious that the fares must all be dumped from the upper rests U V onto the lower rest W before it can be dumped, and that when the latter is dumped no fares will remain on any of the rests of the box, as all the fare-rests will then be in position to discharge the fares from them into the final-deposit drawer D at the bottom of the box. As shown in Fig. 3, the fare-rest levers and link and their springs are fitted into cavities provided for them in one side wall A of the box, and the entire lever mechanism is concealed and held in place by a metal plate, $a^6$, (shown in Fig. 6 of the drawings,) and which is let in about flush with the outer face of the wall of the box, which is a compact and serviceable construction.

A mirror or reflecting-plate, Y, is fitted between the two upper fare-rests U V to allow the driver to see the reverse side of the coins or tickets deposited by the passengers and which fall to the rest U, thus enabling him to detect spurious payments more surely. This mirror is shown, described, and claimed in a prior patent granted to me.

As a convenient means of holding a lantern, Z, to the driver's side of the fare-box, I have provided the fare-box, at the edge of one of its side walls A, with a couple of lugs, $z'$ $z'$, the upper lug having a forwardly-extending horizontal slot, $z^2$, which connects with the bore $z^3$ of it, into which the vertical part 6 of an angular bracket, 7, held to the side of the lantern, enters, while the horizontal part of the bracket enters the slot $z^2$ of the upper lug $z'$. The vertical part of the lower angular bracket, 8, enters a vertical hole in the lower lug $z'$. It is obvious that with this construction the lantern is supported from its side, and preferably from its air-supply tube Z, when a lantern of the style shown in Fig. 1 of the drawings is used, and the lantern will be held securely, and what strain may be brought upon it when in position is not thrown upon the oil-reservoir.

Having thus described my invention, what I claim as new, and desire to secure by Letters Patent, is—

1. The combination, with a fare-box having a slot and opposite grooves in its walls registering therewith, and a glass or transparent plate slipped through said slot into the grooves, of a plug inserted in the slot outside the plate, and fastenings securing the plug at the inside of the box, substantially as described, whereby the glass cannot be removed through the slot without first disengaging the plug-fastenings inside the box, as and for the purposes set forth.

2. The combination, in a fare-box, of opposite side walls A A, grooved at $g$ $g$, top, bottom, and front plates, $a$ $a'$ $a^2$ $a^3$ $a^4$, fixed to the side walls, and said top plate slotted at $g^2$, a glass, G, held in the grooves $g$, a strip, H, closing the slot $g^2$, and fastenings securing said strip at the inside of the box, substantially as herein set forth.

3. The combination, in a fare-box, of opposite side walls having grooves or ways and fixed top, bottom, and front plates, $a$ $a'$ $a^2$ $a^3$ $a^4$, and said top plate $a$ slotted at $g^2$, a glass, G, held in the grooves $g$, fastenings above the glass at the inside of the box, a strip, H, closing the slot $g^2$, and fastenings securing said strip at the inside of the box, substantially as herein set forth.

4. In a fare-box, the door made to lock behind an upper plate of the box, combined with a fare-deposit drawer locking at the outside of the lower part of the door, substantially as herein set forth.

5. In a fare-box, the door made to lock behind an upper plate of the box and fitted at the sides into rabbets of the box-frame, combined with a fare-deposit drawer locking at the outside of the lower part of the door, substantially as herein set forth.

6. In a fare-box, the door made to lock behind an upper plate of the box, combined with a fare-deposit drawer locking at the outside of the lower part of the door, and said door provided with a bolt holding it up into place when the fare-drawer is removed, substantially as herein set forth.

7. In a fare-box, the door made to lock behind an upper plate of the box, combined with a fare-deposit drawer overlapping the outside of the lower part of the door, and lock-fastenings for said drawer, substantially as herein set forth.

8. In a fare-box, the combination, with side walls A A and top, bottom, and front plates, $a$ $a'$ $a^2$ $a^3$ $a^4$, fixed thereto, and said top plate $a$ slotted and provided in said slot with a removable strip, H, having fastenings inside the box, of a removable plate, B, giving access to the fastenings of said strip H, substantially as herein set forth.

9. In a fare-box made with side walls A A and top, bottom, and front plates, $a$ $a'$ $a^2$ $a^3$ $a^4$, fixed thereto, and said top $a$, slotted and fitted with a removable strip, H, having fastenings inside the box, substantially as specified, the combination, with said parts, of a removable plate, B, tongued and grooved into the parts A A $a$, and also having an outer lower tongue, $b^4$, a door, C, fitted to the side walls A A and provided with a rear upper tongue, $c$, locking behind the tongue $b^4$, and having a front rabbet, $c^3$, at its lower end, and a fare-deposit drawer at the bottom of the box, having a projection entering the rabbet $c^3$ and provided with a lock or locks, substantially as herein set forth.

10. In a fare-box, a fare-chute interposed between the pay chute or hole and the fare-rests, and having relatively-fixed outer side walls and provided between or within said outside walls with one or more yielding walls, substantially as herein set forth.

11. In a fare-box, a fare-chute having a discharge mouth or opening having no direct lateral or marginal communication with the side walls of the box, and formed with relatively-fixed outside walls and with one or more interior yielding walls normally allowing free passage of fares, and providing one or more robbing-implement pockets or traps within the chute and behind and below said yielding wall or walls, substantially as herein set forth.

12. In a fare-box, a fare-chute, F, interposed between the pay-chute and fare-rests and formed with side walls M M and front and rear walls, N O, disposed to deflect and stop a robbing implement and to provide a discharge opening or mouth which has no communication with the side walls of the box, a wall or plate, P, next the wall O, and adapted to yield at its lower end, and a trap, R, arranged below and behind said yielding wall, substantially as herein set forth.

13. A fare-box fare-chute made as an independent structure, adapted for interposition between the pay-chute and fare-rests of the box and formed so as to separate the pay-chute and fare-rest or deposit-compartments of the box, and provided with a downwardly-ranging discharge-mouth having fixed outer side walls, and provided with one or more interior yielding walls normally allowing free passage of fares, and providing one or more robbing-implement pockets or traps within the chute and behind and below said yielding wall or walls, substantially as herein set forth.

14. The combination, in a fare-box and with a fare-chute therein having a mouth which has no direct lateral or marginal communication with the side walls of the box, of a valve fitted within the chute and closing its mouth should the fare-box be inverted, substantially as herein set forth.

15. In a fare-box, the fare-chute next the pay chute or hole, provided at its mouth with a guard plate or valve, combined with a weight which normally holds the plate open and closes it should the box be inverted, substantially as herein set forth.

16. In a fare-box, a fare-chute interposed between the pay chute or hole and the fare-rests and having a mouth which has no communication with the side walls of the box, and said fare-chute provided with a wall, N, a yielding wall, P, a trap, R, and an interior plate-valve, S, substantially as herein set forth.

17. In a fare-box, a lower fare-chute fitted at or above the final fare-deposit compartment of the box, and having a discharge opening or mouth which projects into the fare-deposit compartment and has no direct lateral or marginal communication with the side walls of this compartment or a drawer placed therein, substantially as herein set forth.

18. In a fare-box, a lower fare-chute fitted at or above the final fare-deposit compartment of the box, and having a discharge opening or mouth which projects into the fare-deposit compartment and has no direct lateral or marginal communication with the side walls of this compartment, combined with a hinged plate or valve fitted within the chute and closing it should the fare-box be inverted, substantially as herein set forth.

19. In a fare-box having fare-rests, as $U'V'$, the combination, with said rests, of levers U V, adapted to tilt them, said lever U having an extension, $U^2$, cut away at $u^2$, at its lower forward corner or part, and said lever V having an extension, $V^2$, cut away at $v^2$, at its upper forward corner or part, said cut-away part $v^2$ normally facing the rounded portion of the plate $U^2$, and the cut-away part $u^2$ normally standing in front of the cut-away portion $v^2$, substantially as described, whereby the upper fare-rest, $U'$, may be dumped independently of the next lower fare-rest, $V'$, and the fare-rest $V'$ cannot be dumped without first dumping the fare-rest $U'$, as and for the purposes set forth.

20. In a fare-box having upper, intermediate, and lower fare-rests, as $U'V'W'$, and operating-levers U V W therefor, said levers U V having segmental extensions $U^2 V^2$ cut away at $u^2 v^2$, respectively, and said levers V W connected by a link, X, which is pivoted to the lever W, and has a slot, $x'$, at its upper end engaging a pin, $v'$, on the lever V, substantially as described, for the purposes set forth.

21. In a fare-box having fare-rests, as $V'W'$, and operating-levers V W, adapted for tilting the rests, said levers connected by a link, X, pivoted to the lever W, and having a slot-and-pin connection, $x' v'$, with the lever V, substantially as herein set forth.

TIMOTHY L. BEAMAN.

Witnesses:
W. H. GEERS,
T. W. ARMSTRONG.